United States Patent
Moses et al.

(10) Patent No.: US 6,696,528 B2
(45) Date of Patent: Feb. 24, 2004

(54) LOW MOLECULAR WEIGHT ENGINEERING THERMOPLASTIC POLYURETHANE AND BLENDS THEREOF

(75) Inventors: Paul J. Moses, Lake Jackson, TX (US); Edward Louis D'Hooghe, Hulst (NL); Wilfred van Pelt, Breda, GA (US)

(73) Assignee: The Dow Chemical Company, Midland, MI (US)

(*) Notice: Subject to any disclaimer, the term of this patent is extended or adjusted under 35 U.S.C. 154(b) by 12 days.

(21) Appl. No.: 09/925,070

(22) Filed: Aug. 7, 2001

(65) Prior Publication Data

US 2002/0058780 A1 May 16, 2002

Related U.S. Application Data

(60) Provisional application No. 60/223,900, filed on Aug. 9, 2000.

(51) Int. Cl.$^7$ .................................................. C08L 7/10
(52) U.S. Cl. ...................................... 525/395; 525/453
(58) Field of Search ................................. 525/395, 453

(56) References Cited

U.S. PATENT DOCUMENTS

| | | | | |
|---|---|---|---|---|
| 3,351,851 A | 11/1967 | Darling | ........................ | 323/89 |
| 3,379,792 A | 4/1968 | Finholt | ........................ | 260/857 |
| 3,383,435 A | 5/1968 | Cizek | ........................ | 260/874 |
| 3,642,964 A | 2/1972 | Rausch et al. | ................ | 264/40 |
| 3,933,941 A | 1/1976 | Yonemitsu et al. | | |
| 3,959,211 A | 5/1976 | Cooper | ..................... | 260/42.18 |
| 4,080,314 A | 3/1978 | Bonk et al. | ................. | 260/77.5 |
| 4,385,133 A | 5/1983 | Alberino | ...................... | 521/159 |
| 4,446,278 A | 5/1984 | Loucks | ........................ | 525/92 |
| 4,522,975 A | 6/1985 | O'Connor et al. | ........... | 524/702 |
| 4,804,712 A | 2/1989 | Traugott et al. | ............. | 525/152 |
| 5,167,899 A | 12/1992 | Jezic | .......................... | 264/103 |
| 6,117,943 A * | 9/2000 | d'Hooghe | ..................... | 525/68 |

FOREIGN PATENT DOCUMENTS

| | | | | |
|---|---|---|---|---|
| EP | 443 144 A2 | 12/1990 | ........... | C08G/18/10 |
| EP | 687 695 A1 | 12/1995 | ........... | C08G/18/28 |
| GB | 1520 940 | 8/1978 | ......... | C07C/125/06 |
| JP | WO972177 A | 6/1997 | | |
| WO | WO 99/45068 | 9/1999 | ........... | C08L/75/04 |
| WO | WO 00/15711 | 3/2000 | ............ | C08K/9/08 |

OTHER PUBLICATIONS

Venderbosch et al., *Polymer*, vol. 36, p. 4349 (1994).
Venderbosch et al., *Polymer*, vol. 36, p. 1167 (1995a).
Venderbosch et al., *Polymer*, vol. 36, p. 2903 (1995b).

* cited by examiner

*Primary Examiner*—Patricia A. Short

(57) ABSTRACT

A low molecular weight engineering thermoplastic polyurethane (ETPU) can be homogeneously melt blended with a polyarylene ether (PAE) to give a low viscosity melt processable blend, and subsequently cooled to form a heterogeneous dispersion of the ETPU in the PAE that has two $T_g$s, one that is close to the $T_g$ of the pure ETPU, and one that is close to the $T_g$ of the pure PAE. As such, the composite blend retains the properties of the polyarylene ether.

4 Claims, No Drawings

LOW MOLECULAR WEIGHT ENGINEERING THERMOPLASTIC POLYURETHANE AND BLENDS THEREOF

CROSS-REFERENCE STATEMENT

This application claims the benefit of U.S. Provisional Application No. 60/223,900, filed Aug. 9, 2000.

BACKGROUND OF THE INVENTION

The present invention relates to a low molecular weight engineering thermoplastic polyurethane and blends thereof. More particularly the invention relates to a dispersion of a low molecular weight engineering thermoplastic polyurethane in a polyarylene ether matrix.

Polyarylene ethers (PAEs) are a class of thermoplastic resins with excellent mechanical and electrical properties, heat resistance, flame retardancy, low moisture absorption, and dimensional stability. These resins are widely used in automobile interiors, particularly instrument panels, and electrical as well as electronic applications.

PAEs are very difficult to process (for example, by injection molding) as a result of their high melt viscosities and their high processing temperature relative to their oxidative degradation temperature. Consequently, PAEs are commonly blended with compatible polymers such as polystyrene (WO 97/21771 and U.S. Pat. No. 4,804,712); polyamides (U.S. Pat. No. 3,379,792); polyolefins (U.S. Pat. No. 3,351,851); rubber-modified styrene resins (U.S. Pat. Nos. 3,383,435 and 3,959,211, and Ger. Offen. No. 2,047,613); and mixtures of polystyrene and polycarbonate (U.S. Pat. Nos. 3,933,941 and 4,446,278). Unfortunately, improvements in processing have generally been obtained at the expense of flexural modulus, flexural strength, or heat distortion temperature.

Epoxy resins have also been investigated as a reactive solvent for the PAE. (See Venderbosch, R. W., "Processing of Intractable Polymers using Reactive Solvents," Ph.D. Thesis, Eindhoven (1995); Vanderbosch et al., *Polymer*, Vol. 35, p. 4349 (1994); Venderbosch et al., *Polymer*, Vol. 36, p. 1167 (1995a); and Venderbosch et al., *Polymer*, Vol. 36, p. 2903 (1995b)). In this instance, the PAE is first dissolved in an epoxy resin to form a solution that is preferably homogeneous. An article is then shaped from the solution, and the solution is cured at elevated temperatures, resulting in a phase separation that can give a continuous PAE phase with epoxy domains interspersed therein. The properties of the finished article are primarily determined by the PAE; however, the use of an epoxy resin as a reactive solvent for the PAE is not practical in a continuous melt process like injection molding because the epoxy resin needs a curing agent to set. The curing agent will, over time, accumulate in the injection molding barrel, thereby fouling the machine. Furthermore, the cure and subsequent phase separation has to take place at at least 150° C., which is impractical in a molder environment.

In view of the deficiencies in the art, it would be desirable to find a reactive solvent that would solve the processing problems inherent in some reactive solvents for PAE, without deleteriously affecting the physical properties of the PAE.

SUMMARY OF THE INVENTION

The present invention addresses a need in the art by providing a composition that comprises a single phase melt containing 1) a polyarylene ether and 2) an engineering thermoplastic polyurethane having a) a $T_g$ of at least 50° C. and b) a number average molecular weight of not greater than about 10000, and not less than 2000 amu; wherein the polyarylene ether is represented by the formula:

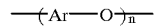

where Ar is a substituted or unsubstituted aromatic nucleus and n is an integer of at least 10.

In another aspect, the present invention is a two-phase composite that comprises 1) a polyarylene ether and 2) an engineering thermoplastic polyurethane having a) a $T_g$ of at least 50° C. and b) a number average molecular weight of not greater than about 10,000, and not less than 2000 amu; wherein the polyarylene ether is represented by the formula:

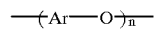

where Ar is a substituted or unsubstituted aromatic nucleus and n is an integer of at least 10, and wherein the composite is further characterized by having a first $T_g$ within 5° C. of the $T_g$ of the pure engineering thermoplastic polyurethane and a second $T_g$ within 10° C. of the $T_g$ of the pure polyarylene ether.

In a third aspect, the present invention is a composition comprising an engineering thermoplastic polyurethane having a $T_g$ of at least 50° C. and a number average molecular weight of not more than 10,000 and not less than 3000 amu (Daltons).

The low molecular weight engineering thermoplastic polyurethanes (ETPUs) are depolymerizable at advanced temperatures, resulting in a dramatic decrease in melt viscosity, and repolymerizable at reduced temperatures. Moreover, the ETPU and PAE form a homogeneous melt at advanced temperatures below the degradation temperature of the PAE, and form a heterogeneous dispersion of the ETPU in a PAE matrix phase at reduced temperatures. Consequently, the blend of the PAE and ETPU melt processable at temperatures below the degradation temperature of the PAE, yet retain the properties of the unadulterated PAE at the reduced temperatures.

DETAILED DESCRIPTION OF THE INVENTION

The present invention is a dispersion comprising a PAE and an ETPU having a $T_g$ of at least 50° C. and a number average molecular weight of not more than 10,000, preferably not more than 7,000, and more preferably not more than 5500 amu; and not less than 1000, preferably not less than 2000, and more preferably not less than 3000 amu. The PAE is represented by the following formula:

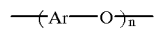

where Ar is a substituted or unsubstituted aromatic nucleus and n is an integer of at least 10. The aromatic nucleus can be, for example, phenylene, alkylated phenylene, chlorophenylene, bromophenylene, and naphthalene. Ar is preferably 2,6-dimethyl-1,4-phenylene,2-methyl-6-ethyl-1, 4-phenylene,2,6-diethyl-1,4-phenylene, and 2,3,6-trimethyl-1,4-phenylene; Ar is more preferably 2,6-dimethyl-1,4-phenylene. Preferred PAEs are poly(2,6-dimethyl-1,4-phenylene) ether and the copolymer obtained by the polymerization of 2,6-dimethyl phenol and 2,3,6-trimethyl phenol, with poly(2,6-dimethyl-1,4-phenylene) ether being more preferred.

The low molecular weight ETPUs contain structural units formed from the reaction of a polyisocyanate, a diol chain extender, a monofunctional chain stopper, and optionally, a high molecular weight polyol. The polyisocyanate that is used to form the TPU is preferably a diisocyanate, which may be aromatic, aliphatic, or cycloaliphatic. Representative examples of these preferred diisocyanates can be found in U.S. Pat. Nos. 4,385,133, 4,522,975, and 5,167,899, the disclosure of which diisocyanates are incorporated herein by reference. Preferred diisocyanates include 4,4'-diisocyanatodiphenyl-methane, p-phenylene diisocyanate, 1,3-bis(isocyanatomethyl)cyclohexane, 1,4-diisocyanatocyclohexane, hexamethylene diisocyanate, 1,5-naphthalene diisocyanate, 3,3'-dimethyl-4,4'-biphenyl diisocyanate, 4,4'-diisocyanatodicycl, and 2,4-toluene diisocyanate, or mixtures thereof. More preferred are 4,4'-diisocyanatodicyclohexylmethane and 4,4'-diisocyanatodiphenylmethane.

As used herein, the term "diol chain extender" refers to a low molecular diol having a molecular weight of not greater than 200. Preferred chain extenders include ethylene glycol, 1,3-propanediol, 1,4-butanediol, 1,5-pentanediol, 1,6-hexanediol, diethylene glycol, triethylene glycol, tetraethylene glycol, neopental glycol, 1,4-cyclohexanedimethanol, and 1,4-bishydroxyethylhydroquinone, and combinations thereof. Particularly preferred difunctional chain extenders include 1,6-hexanediol and mixtures of 1,4-butane diol and diethylene glycol, 1,4-butane diol and triethylene glycol, and 1,4-butane diol and tetraethylene glycol.

As used herein, the term "monofunctional chain stopper" refers to an aliphatic, cycloaliphatic, or aromatic monoalcohol, monoamine, or monothiol. In general, the type and the concentration of the monofunctional chain stopper is preferably selected so that the final composite has two $T_g$s, one of which is within 10° C., more preferably within 5° C., of the $T_g$ of the PAE, and the other of which is within 5° C., more preferably within 2° C., of the ETPU. The monofunctional chain stopper is preferably a monoalcohol, more preferably a $C_2$–$C_{20}$ monoalcohol. Examples of preferred monofunctional chain stoppers include, 1-butanol, 1-hexanol, 2-hexanol, 1-octanol, 2-octanol 1-decanol, 1-dodecanol. An example of a more preferred monofunctional chain stopper is 1-hexanol.

The monofunctional chain stopper is preferably used in an amount of not less than 1 mole percent, more preferably not less than 2 mole percent, and most preferably not less than 4 mole percent based on the weight of the chain stopper, the diisocyanate and the diol chain extender, and preferably not more than 15 mole percent, more preferably not more than 12 mole percent and most preferably not more than 10 mole percent, based on the weight of the chain stopper, the diisocyanate, and the diol chain extender.

The term "high molecular weight polyol" is used herein to refer to a polyol, preferably a diol having a molecular weight of not less than about 500 amu, preferably not less than about 600 amu, more preferably not less than about 1000 amu, and preferably not more than about 6000 amu, more preferably not more than about 3000 amu, and most preferably not more than about 2000 amu. Examples of the optional high molecular weight diols include polyether glycols such as polypropylene glycol, polyethylene glycol, and polytetramethylene glycol; and polyester glycols such as polycaprolactone glycol, as well as compounds that can be prepared from the condensation reaction of an aliphatic diacid, diester, or di(acid chloride) with a $C_2$–$C_8$ linear, branched, or cyclic diol, or an ether-containing diol, or blends thereof. More preferred high molecular weight polyester glycols include polycaprolactone glycol, polyethylene adipate glycol, and polybutylene adipate glycol. Preferably, the high molecular weight polyol is used at a level of not more than 5 weight percent based on the weight of the polyol, the chain stopper, the diisocyanate, and the diol chain extender, more preferably not more than 2 weight percent, more preferably not more than 1 weight percent. Most preferably, the ETPU contains no units from a high molecular weight polyol.

The ETPUs are advantageously prepared in the presence of a suitable catalyst such as those disclosed in U.S. Pat. Re. 37,671, column 5, line 46 to column 6, line 5, which disclosure is incorporated herein by reference. Preferred catalysts include stannous octoate, stannous oleate, dibutyltin dioctoate, and dibutyltin dilaurate. The amount of catalyst used is sufficient to increase the reactivity of an isocyanate group with an OH group without undesirably affecting the properties of the final product, and is preferably in the range of about 0.02 to about 2.0 weight percent based on the total weight of the reactants.

The diisocyanate-to-diol chain extender mole-to-mole ratio is preferably not less than 1.00, more preferably not less than 1.05 and preferably not greater than 1.20, more preferably not greater than 1.10.

The low molecular weight ETPUs can be suitably prepared by batch or continuous processes such as those known in the art. A preferred continuous mixing process is reactive extrusion, such as the twin screw extrusion process disclosed in U.S. Pat. No. 3,642,964, the description of which process is incorporated herein by reference.

The number average molecular weight of the ETPU is not greater than 10,000, more preferably not greater than 7,500, and most preferably not greater than 6000 Daltons, and preferably not less than 2000, more preferably not less than 3000 Daltons. The number average molecular weight can be conveniently measured by size exclusion chromatography using polyethylene oxide standards.

The weight-to-weight ratio of the PAE to the ETPU is preferably not less than 50:50, more preferably not less than 60:40, and most preferably not less than 65:35, and preferably not greater than 85:15, more preferably not greater than 80:20, and most preferably not greater than 75:25. The PAE and ETPU can be compounded by any suitable method including single screw extrusion and twin screw extrusion. The compounding temperature is sufficiently high to melt blend the components without degrading the PAE, preferably in the range of 230° C. and 270° C., more preferably in the range of 240° C. and 260° C.

In the preferred composite article, the $T_g$ of the ETPU in the blend (as measured by dynamic mechanical thermal analysis) is within 5° C. of the $T_g$ of the pure ETPU (as measured by dynamic mechanical thermal analysis), more preferably with 2° C., and most preferably within 1° C. The $T_g$ of the PAE in the blend (as measured by dynamic mechanical thermal analysis) is preferably within 10° C., and more preferably within 5° C. of the $T_g$ of the pure PAE (as measured by dynamic mechanical thermal analysis).

An unusual feature of a PAE/ETPU blend is that the mixture is homogeneous as a melt, but becomes heterogeneous as the melt cools. The homogeneity of the melt allows the blend to be processable at a temperature below the oxidative degradation temperature of the PAE; as the melt is cooled, the TPU phase segregates and the TPU forms a dispersion in a PAE continuous phase so that the physical properties of the final article (for example, the heat distortion temperature, the flexural modulus and the flexural strength) are more like the unadulterated PAE.

The following examples are for illustrative purposes only and are not intended to limit the scope of this invention. All percentages are by weight unless otherwise indicated.

EXAMPLES 1–3

Preparation of a Low Molecular Weight ETPU

A first stream containing MDI (>98% 4,4'-diisocyanatodiphenylmethane) and a second stream containing hexanediol and hexanol (HDO) were fed into a feed port of Berstorff model ZE40OX47D 40-mm twin screw extruder at the rates indicated in Table 1. The melt pump was set at 0 pressure. The drying temperature was 180° F. (82° C.) and the drying time was 4 hours. The reactants and their mole percent are shown in Table 1, as are the number average molecular weights ($M_n$) and the glass transition temperatures ($T_g$, measured using temperature modulated differential scanning calorimetry) of the ETPUs. The non-reactive additives were FOMREZ™ UL-22 catalyst (0.06%, Witco Corp.), IRGANOX™ MD 1010 antioxidant (0.25%, Ciba-Geigy Corp.), trinonylphenyl phosphite (0.2%), and ADVA-WAX 280 bisamide wax (0.5%, Morton International, Inc.).

$M_n$s were determined using size exclusion chromatography (SEC) versus polyethylene oxide (PEO) standards. In this method, 2 mg/mL solutions of the TPU in DMF are analyzed on Waters GPC equipped with 10 micron mixed bed columns (Polymer Labs PL columns) operated at 50° C. with a DMF flow rate of 1 mL/min. The SEC retention time is related to molecular weight as a least squares fit to a third order polynomial of retention time versus peak molecular weight of the PEO standards. The PEO standards were obtained from Polymer Labs and were analyzed as a mixture of 14 polymers with peak molecular weights ranging from 600 Daltons to 1.4 MM Daltons. PEO standards were detected with a Waters 410 DRI refractive index detector and TPU samples were detected with a Applied Biosystems 757 UV detector operating at 285 nm.

TABLE 1

| | Example 1 | Example 2 | Example 3 |
|---|---|---|---|
| feed rate MDI (kg/hr) | 91.2 | 90.4 | 88.8 |
| feed rate HDO + hexanol (kg/hr) | 44.2 | 45.0 | 46.6 |
| MDI (mole %) | 49.37 | 48.40 | 46.68 |
| HDO (mole %) | 47.42 | 44.55 | 39.43 |
| Hexanol (mole %) | 3.21 | 7.04 | 13.89 |
| non-reactives (wt. %) | 1.01 | 1.01 | 1.01 |
| $M_n$ | 6,620 | 4,780 | 2,260 |
| $T_g$ (° C.) | 89 | 84 | 78 |

EXAMPLES 4–6

Preparation of ETPU/PAE Composites

A 30:70 wt/wt blend of each of the low molecular weight ETPUs from Examples 1–3 and the PAE (poly(2,6-dimethyl-1,4-phenylene ether), PPO 803, $M_w$ of 32 kg/mole, $T_g$ of 219° C., obtained from General Electric Plastics, Bergen op Zoom, The Netherlands) were prepared using a miniature co-rotating recirculating twin screw extruder with a volume of 5 cm$^3$ at 250° C., 100 rpm, and a residence time of 5 minutes. The $T_g$s of the individual components of the resultant composites are shown in Table 2. For all three examples, two distinct $T_g$ s were measured, indicating a 2 component phase separated system. The lower $T_g$s of the composite (89° C., 84° C., and 76° C.) correspond well with the $T_g$ s of the unblended ETPUs shown in Table 1 (89° C., 84° C., and 78° C.).

TABLE 2

| | ETPU $T_g$ (° C.) | PAE $T_g$ (° C.) |
|---|---|---|
| Example 4 | 89 | 217 |
| Example 5 | 84 | 215 |
| Example 6 | 76 | 210 |

The $T_g$s of the blends and the $T_g$ of the pure PAE were measured by dynamic mechanical thermal analysis at a scanning rate of 2° C. /min and a frequency of 1 Hz. Just as the lower temperature $T_g$s of the composite correspond very closely to those of the pure ETPU samples, the high temperature $T_g$s of the composite correspond closely to that of the pure PAE. This result suggests that phase separation was complete, or nearly so.

What is claimed is:

1. A composition that comprises a single phase melt containing 1) a polyarylene ether and 2) depolymerized product of an engineering thermoplastic polyurethane having a) a $T_g$ of at least 50° C. and b) a number average molecular weight (prior to being depolymerized) of not greater than about 7500, and not less than 3000 amu; wherein the polyarylene ether is represented by the formula:

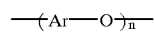

where Ar is a substituted or unsubstituted aromatic nucleus and n is an integer of at least 10 and wherein the weight-to-weight ratio of the polyarylene ether and the engineering thermoplastic polyurethane is not less than 60:40 and not greater than 85:15.

2. The composition of claim 1 wherein the polyarylene ether is poly(2,6-dimethyl-1,4-phenylene) ether or the copolymer obtained by the polymerization of 2,6-dimethyl phenol and 2,3,6-trimethyl phenol.

3. The composition of claim 2 wherein the polyarylene ether is poly(2,6-dimethyl-1,4-phenylene) ether.

4. The composition of claim 3 wherein the weight-to-weight ratio of the polyarylene ether and the engineering thermoplastic polyurethane is not less than 65:35 and not greater than 75:25.

* * * * *